US006087288A

United States Patent [19]

Masumura et al.

[11] Patent Number: 6,087,288

[45] Date of Patent: Jul. 11, 2000

[54] DIELECTRIC CERAMIC COMPOSITION

[75] Inventors: Hitoshi Masumura, Tokyo; Kiyotaka Saito, Yamato; Atsuko Fujii, Funabashi, all of Japan

[73] Assignee: U.S. Philips Corporation, New York, N.Y.

[21] Appl. No.: 09/203,632

[22] Filed: Dec. 1, 1998

[30] Foreign Application Priority Data

Dec. 1, 1997 [JP] Japan .................................... 9-347053

[51] Int. Cl.[7] .................................................. C04B 35/468

[52] U.S. Cl. ............................................ 501/138; 501/139

[58] Field of Search ...................................... 501/138, 139

[56] References Cited

U.S. PATENT DOCUMENTS

| | | | |
|---|---|---|---|
| 5,250,481 | 10/1993 | Park | 501/138 |
| 5,362,693 | 11/1994 | Chu et al. | 501/138 |
| 5,650,367 | 7/1997 | Fujikawa et al. | 501/139 |

FOREIGN PATENT DOCUMENTS

| | | | |
|---|---|---|---|
| 5792575 | 9/1957 | Japan | C04B 35/46 |

*Primary Examiner*—Karl Group

[57] ABSTRACT

A dielectric ceramic composition including a compound of the $BaTiO_3$—$Nb_2O_5$—$Co_3O_4$ group. The composition contains 1.1–1.4 mo. % of in total $Nb_2O_5$ and $Co_3O_4$ wherein the molar ration of $Nb_2O_5$ to $Co_3O_4$ is between 4.4 and 5.0. The composition contains 0.02–0.06% by weight of $MnCO_3$, 0.02–0.25% by weight of $Nd_2O_3$, 0.02–0.10% by weight of $Y_2O_3$ and 0.05–0.15% by weight of $Al_2O_3$ with respect to the weight of the composition. Laminated ceramic capacitors including the dielectric ceramic material show a capacity changing ration which is less than 15% in the temperature range between −55° C. and +125° C., a dielectric loss which is smaller than 3.5% and a dielectric constant which is 4000 or more.

2 Claims, 4 Drawing Sheets

DIELECTRIC CERAMIC COMPOSITION

BACKGROUND OF THE INVENTION

This invention relates to a high dielectric ceramic composition, particularly to a laminated ceramic capacitor which has widely been used in an electronic circuit, etc. to be used in an electronic device such as a communication device, an electronic computer, a television receiver, etc. As such laminated ceramic capacitor, preferred are those which are small sized, show a large capacity and have good temperature characteristics.

To obtain a laminated ceramic capacitor with a small size and a large capacity, comprising a ceramic composition with a high dielectric constant and a small temperature dependent capacity (TCC) ceramic compositions are known comprising $BaTiO_3$ as a main component and a bismuth compound such as $Bi_2O_3$—$TiO_2$, $Bi_2O_3$—$SnO_2$, $Bi_2O_3$—$ZrO_2$, etc. being added thereto. Also known are those compositions which mainly comprise $BaTiO_3$, to which a bismuth compound, MgO and $SiO_2$, etc. are added as additives.

However, such a conventional ceramic composition is low in the dielectric constant, having typical values of 1000 to 2000. When the dielectric constant at normal temperature is enhanced, the temperature dependent capacity (TCC) becomes large, and the dielectric losses also become large. A bismuth compound which is added for preventing change of capacity as a function of temparature (TCC) causes unevenness in the composition due to evaporation of $Bi_2O_3$ when sintering so that the electronic characteristics of the ceramic composition are fluctuating. Moreover, there exists the inconvenience that $Bi_2O_3$ and Pd or Pd—Ag, which are used for inner electrodes for forming a laminated ceramic capacitor, react with each other.In principle, it could be helpful to use Pt as material for the inner electrodes, since Pt does not react with $Bi_2O_3$. However Pt is extremely expensive.

On the other hand, Japanese Laid-Open Patent Application No. 57-92575 discloses a ceramic composition having a high dielectric constant which mainly comprises $BaTiO_3$, to which $Nd_2O_3$, $Nb_2O_5$, $SiO_2$, $MnO_2$ and an oxide of Co are added as an additive without using a bismuth compound, as a material having a high dielectric constant and good temperature characteristics.

In the ceramic composition group having a high dielectric constant disclosed in the Japanese Laid-Open Patent Application No. 57-92575, the temperature dependency of a dielectric constant is good, varying less than ±15% in the temperature range of −55° C. to +125° C. However, the dielectric constants do not yet exceed 4000. On the other hand, a laminated ceramic capacitor preferably should satisfy X7R characteristics defined by the EIA standard. The capacity of capacitors answering the X7R characteristics varies less than ±15% over a wide temperature range of −55° C. to +125° C. when the electrostatic capacity at +25° C. is a reference.

SUMMARY OF THE INVENTION

It is an object of the invention to provide a ceramic composition with a high dielectric constant which satisfies the X7R characteristics, a dielectric loss of which is less than 3.5% and a dielectric constant which is 4000 or more.

The ceramic composition according to the present invention comprises a compound of $BaTiO_3$—$Nb_2O_5$—$Co_3O_4$ containing 1.1–1.4 mol. % of in total $Nb_2O_5$ and $Co_3O_4$ wherein the molar ratio of $Nb_2O_5$ to $Co_3O_4$ is between 4.4 and 5.0, said dielectric ceramic composition comprising as an additive 0.02–0.06% by weight of $MnCO_3$, 0.02–0.25% by weight of $Nd_2O_3$, 0.02–0.10% by weight of $Y_2O_3$ and 0.05–0.15% by weight of $Al_2O_3$ with respect to the weight of said compound. A preferred embodiment is characterized in that the ratio of $BaO/TiO_2$ is between 0.997 and 1.000, inclusive.

The inventors have studied and investigated to obtain a high dielectric ceramic composition, having a capacity changing ratio of an electrostatic capacity of which is less than ±15% in a temperature range of −55° C. to +125° C., a dielectric loss of which is less than 3.5% and a dielectric constant which is 4000 or more. As a result, the inventors have found that the above-mentioned composition according to the invention is suitable.

DESCRIPTION OF THE PREFERRED EMBODIMENTS

Figure 1:
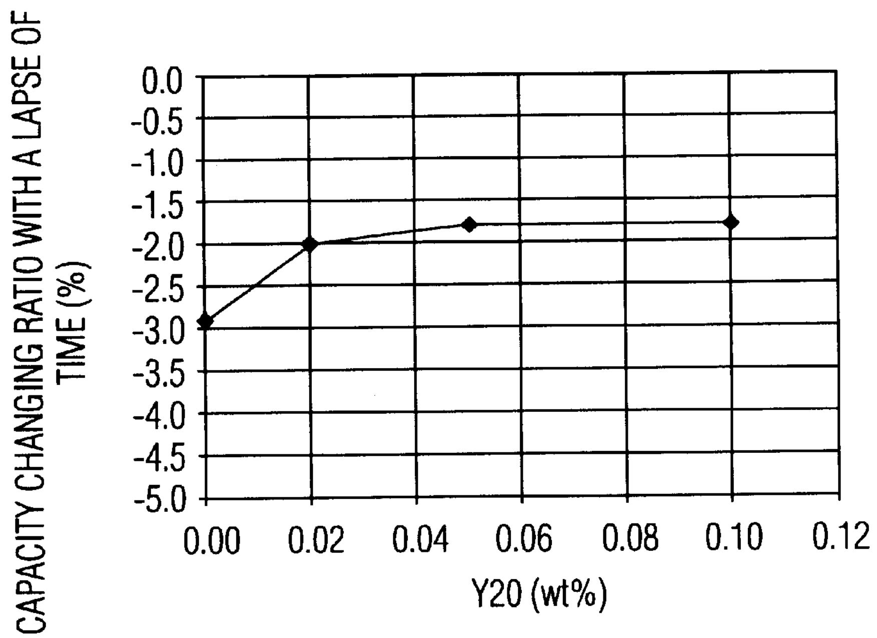
FIG. 1 is a graph showing a capacity changing ratio of an added amount of $Y_2O_3$ and an electrostatic capacity relative to temperature.
Figure 2A:
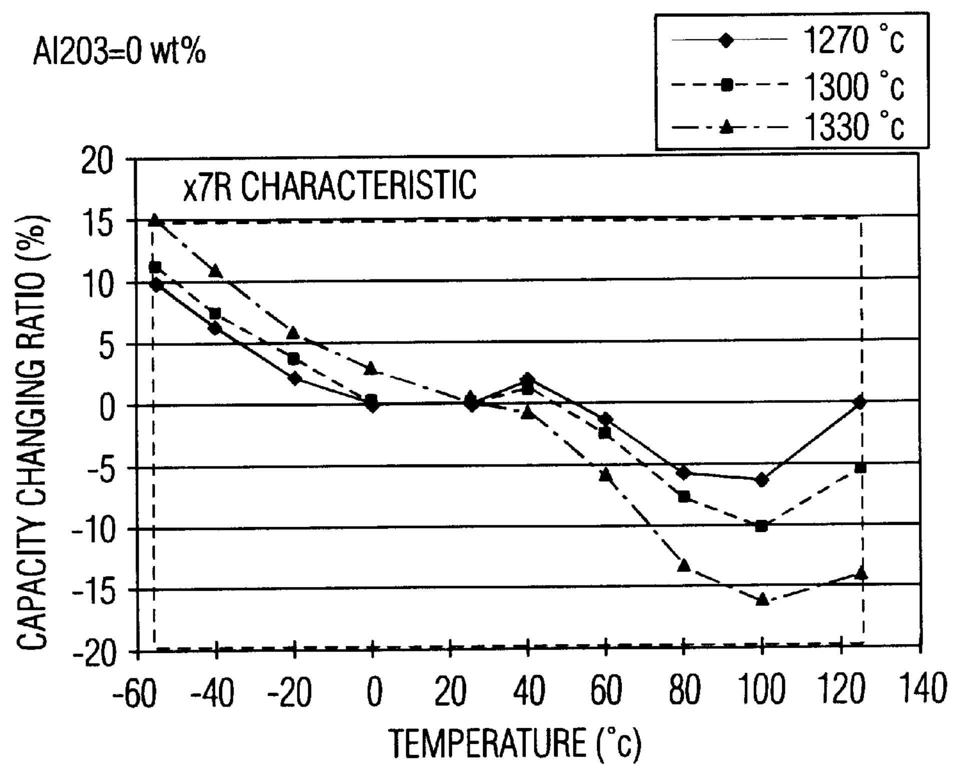
FIG 2A, FIG. 2B and FIG. 2C are graphs showing a capacity changing ratio of an added amount of $Al_2O_3$ and an electrostatic capacity relative to temperature by changing a sintering temperature.
Figure 2B:
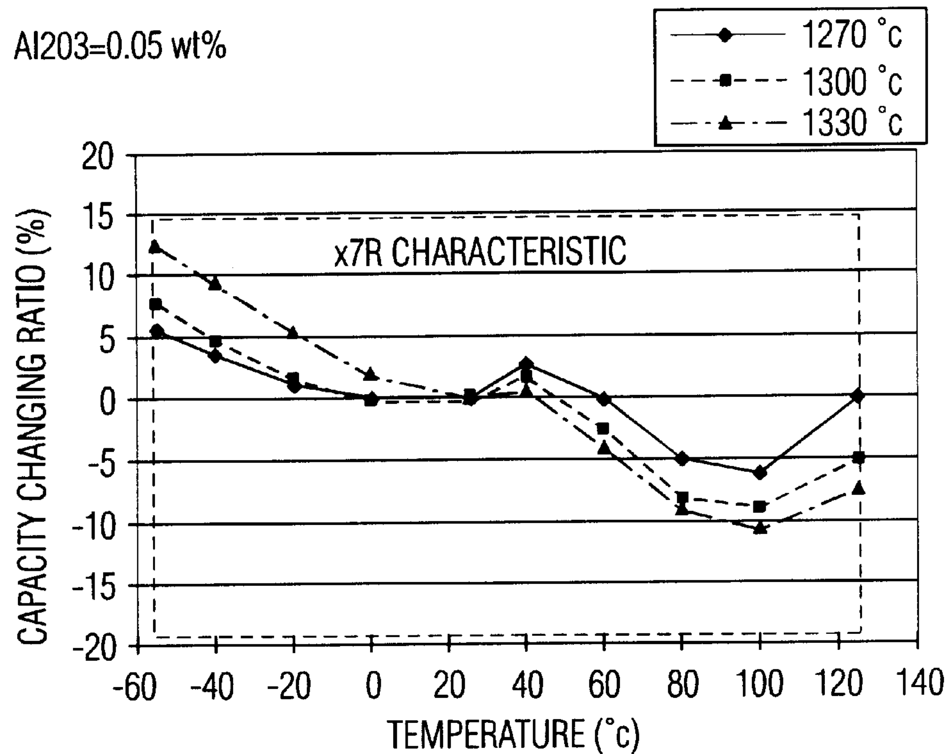
Figure 2C:
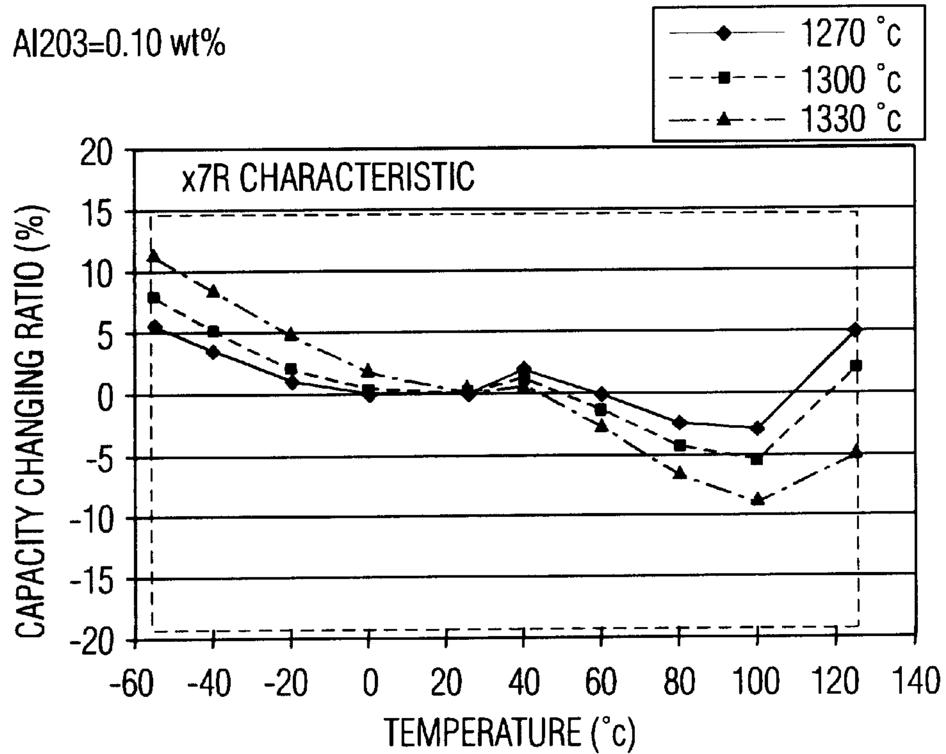
Figure 2D:
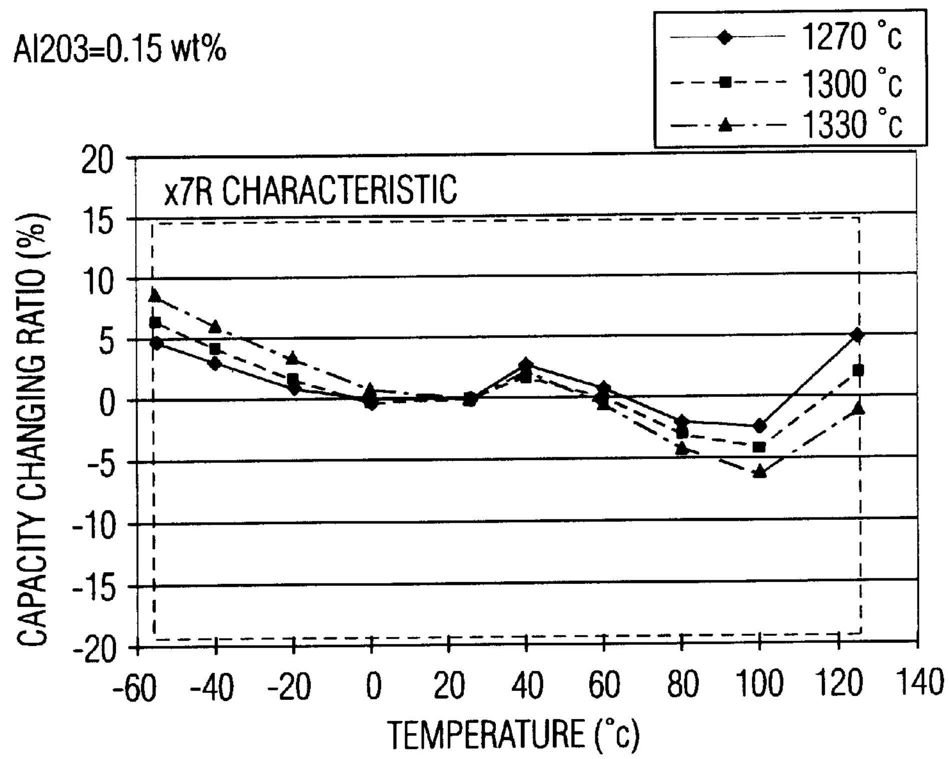
Figure 2E:
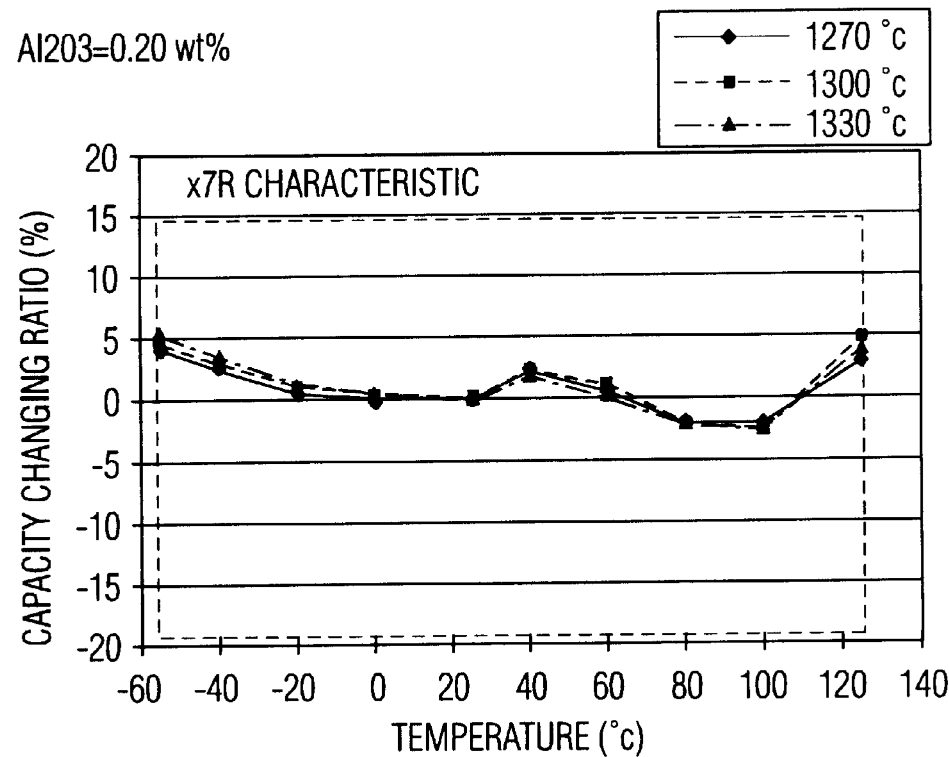

A process for manufacturing a laminated ceramic capacitor using the ceramic composition according to the present invention will now be described and examples of the present invention will be explained in detail with reference to the figures of the drawing and tables showing the electric characteristics of the laminated ceramic capacitor prepared by this manufacturing process and the compositions of the ceramic composition according to the invention.

As a starting material of a ceramic composition, $BaTiO_3$ (purity: 99.98%) is prepared by a solution synthetic method. Since the solution synthetic method is well known to a person skilled in the art, it is not described here in detail. The molar ratio of $BaO/TiO_2$ of the starting material $BaTiO_3$ was 1.000. Next, as other starting materials of the ceramic composition, $Nb_2O_5$ and $Co_3O_4$, and as starting materials of an additive, $MnCO_3$, $Y_2O_3$, $Al_2O_3$ and $Nd_2O_3$ were used, and weighed so as to obtain the composition with a ratio as shown in Table 1. After weighing, wet mixing was carried out for 3 hours to obtain a mixture. To the mixture an organic binder was added, and wet mixing was carried out to form a ceramic slurry. This ceramic slurry was molded to a sheet by the doctor blade method to obtain a green sheet with a thickness of 12 $\mu$m and a rectangular shape. By optionally adding $TiO_2$ and $BaCO_3$ during the above-mentioned wet mixing, adjustment of the molar ratio of $BaO/TiO_2$ was carried out.

TABLE 1

A list of composition

| Sample No. | $BaTiO_3$ Mol. % | $Nb_2O_5$ Mol. % | $Co_3O_4$ Mol. % | $MnCO_3$ Weight % | $Nd_2O_3$ Weight % | $Y_2O_3$ Weight % | $Al_2O_3$ Weight % | $Nb_2O_5/Co_3O_4$ Molar ratio | $Nb_2O_5 + Co_3O_4$ Mol. % |
|---|---|---|---|---|---|---|---|---|---|
| *1 | 98.800 | 0.969 | 0.231 | 0.06 | 0.1 | 0.05 | 0.05 | 4.2 | 1.2 |
| 2 | 98.800 | 0.978 | 0.222 | 0.06 | 0.1 | 0.05 | 0.05 | 4.4 | 1.2 |
| 3 | 98.800 | 0.986 | 0.214 | 0.06 | 0.1 | 0.05 | 0.05 | 4.6 | 1.2 |
| 4 | 98.800 | 0.993 | 0.207 | 0.06 | 0.1 | 0.05 | 0.05 | 4.8 | 1.2 |
| 5 | 98.800 | 1.000 | 0.200 | 0.06 | 0.1 | 0.05 | 0.05 | 5.0 | 1.2 |
| *6 | 98.800 | 1.006 | 0.194 | 0.06 | 0.1 | 0.05 | 0.05 | 5.2 | 1.2 |
| *7 | 99.000 | 0.821 | 0.179 | 0.06 | 0.1 | 0.05 | 0.05 | 4.6 | 1.0 |
| 8 | 98.900 | 0.904 | 0.196 | 0.06 | 0.1 | 0.05 | 0.05 | 4.6 | 1.1 |
| 9 | 98.600 | 1.150 | 0.250 | 0.06 | 0.1 | 0.05 | 0.05 | 4.6 | 1.4 |
| *10 | 98.500 | 1.232 | 0.268 | 0.06 | 0.1 | 0.05 | 0.05 | 4.6 | 1.5 |
| *11 | 98.800 | 0.986 | 0.214 | 0 | 0.1 | 0.05 | 0.05 | 4.6 | 1.2 |
| 12 | 98.800 | 0.986 | 0.214 | 0.02 | 0.1 | 0.05 | 0.05 | 4.8 | 1.2 |
| 13 | 98.800 | 0.986 | 0.214 | 0.04 | 0.1 | 0.05 | 0.05 | 4.6 | 1.2 |
| 14 | 98.800 | 0.986 | 0.214 | 0.06 | 0.1 | 0.05 | 0.05 | 4.8 | 1.2 |
| *15 | 98.800 | 0.986 | 0.214 | 0.1 | 0.1 | 0.05 | 0.05 | 4.6 | 1.2 |
| *16 | 98.800 | 0.986 | 0.214 | 0.06 | 0 | 0.05 | 0.05 | 4.8 | 1.2 |
| 17 | 98.800 | 0.986 | 0.214 | 0.06 | 0.02 | 0.05 | 0.05 | 4.6 | 1.2 |
| 18 | 98.800 | 0.986 | 0.214 | 0.06 | 0.05 | 0.05 | 0.05 | 4.6 | 1.2 |
| 19 | 98.800 | 0.986 | 0.214 | 0.06 | 0.1 | 0.05 | 0.05 | 4.6 | 1.2 |
| 20 | 98.800 | 0.986 | 0.214 | 0.06 | 0.2 | 0.05 | 0.05 | 4.6 | 1.2 |
| 21 | 98.800 | 0.986 | 0.214 | 0.06 | 0.25 | 0.05 | 0.05 | 4.6 | 1.2 |
| *22 | 98.800 | 0.986 | 0.214 | 0.06 | 0.3 | 0.05 | 0.05 | 4.6 | 1.2 |
| *23 | 98.800 | 0.986 | 0.214 | 0.06 | 0.1 | 0 | 0.05 | 4.6 | 1.2 |
| 24 | 98.800 | 0.986 | 0.214 | 0.06 | 0.1 | 0.02 | 0.05 | 4.6 | 1.2 |
| 25 | 98.800 | 0.986 | 0.214 | 0.06 | 0.1 | 0.05 | 0.05 | 4.6 | 1.2 |
| 26 | 98.800 | 0.986 | 0.214 | 0.06 | 0.1 | 0.1 | 0.05 | 4.6 | 1.2 |
| *27 | 98.800 | 0.986 | 0.214 | 0.06 | 0.1 | 0.2 | 0.05 | 4.6 | 1.2 |
| *28 | 98.800 | 0.986 | 0.214 | 0.06 | 0.1 | 0.05 | 0 | 4.6 | 1.2 |
| 29 | 98.800 | 0.986 | 0.214 | 0.06 | 0.1 | 0.05 | 0.05 | 4.6 | 1.2 |
| 30 | 98.800 | 0.986 | 0.214 | 0.06 | 0.1 | 0.05 | 0.1 | 4.6 | 1.2 |
| 31 | 98.800 | 0.986 | 0.214 | 0.06 | 0.1 | 0.05 | 0.15 | 4.6 | 1.2 |
| *32 | 98.800 | 0.986 | 0.214 | 0.06 | 0.1 | 0.05 | 0.2 | 4.6 | 1.2 |

| Sample No. | $BaTiO_3$ | $Nb_2O_5$ | $Co_3O_4$ | $MnCO_3$ | $Nd_2O_3$ | $Y_2O_3$ | $Al_2O_3$ | $BaO/TiO_2$ ratio |
|---|---|---|---|---|---|---|---|---|
| *33 | 98.800 | 0.986 | 0.214 | 0.06 | 0.1 | 0.05 | 0.05 | 0.994 |
| 34 | 98.800 | 0.986 | 0.214 | 0.06 | 0.1 | 0.05 | 0.05 | 0.997 |
| 35 | 98.800 | 0.986 | 0.214 | 0.06 | 0.1 | 0.05 | 0.05 | 1.000 |
| *36 | 98.800 | 0.986 | 0.214 | 0.06 | 0.1 | 0.05 | 0.05 | 1.003 |

Mark * is out of the range of this invention

Next, a conductive paste mainly comprising Pd on the ceramic green sheet was printed to form an inner electrode. A plurality of the above-mentioned ceramic green sheets onto which these inner electrodes had been formed were laminated to obtain a laminated material in a way that one end of one conductive paste layer as the inner electrode is out of one side of the laminated material, other end of next conductive paste layer is out of the opposite side thereof, and so on.

The above-mentioned laminated material was sintered in air at 1300° C. for 2 hours. After sintering, a silver paste was coated on the both surfaces of the ceramic sintered body and the body was burned in air at 750° C. to form an outer electrode which was electrically connected to a number of the inner electrodes.

The laminated ceramic capacitor obtained as mentioned above have a width of 3.2 mm, a length of 1.6 mm and a thickness of 0.5 mm as outer dimensions. Also, the average thickness of the respective dielectric ceramic layers interposed between the above-mentioned inner electrodes was 8 $\mu$m, and the total number of the effective dielectric ceramic layers was 5.

The electrostatic capacity and the dielectric loss (tan $\delta$) of each of the above-mentioned laminated ceramic capacitors was each measured by using an automatic bridge type of measuring device under the conditions of 1 kHz and 1Vrms. Incidentally, a dielectric constant could be easily obtained by multiplying the electrostatic capacity by a certain coefficient. The method of obtaining the dielectric constant is well known for a person skilled in the art so that it is not described in detail here. Evaluation of the electric characteristics of the laminated ceramic is desirably performed by evaluating a laminated ceramic capacitor having a thickness of the dielectric layer approximately close to the actual product. This is because the dielectric loss changes depending on the electric field strength are to be measured. For example, when the thicknesses of the dielectric layers are 500 $\mu$m and 8 $\mu$m, the measured electric field strengths are 2V/mm and 125V/mm, respectively, when a voltage of the measuring voltage of 1Vrms is applied. Moreover, the inventor has found that the temperature characteristics of the electrostatic capacity also changed depending on the thickness of the dielectric layer. In the present example, the thickness of the dielectric layer was 8 $\mu$m and thus, the characteristics were evaluated with the thickness of the dielectric layer which is an approximately actual thickness of the laminated ceramic capacitor product.

TABLE 2

A list of electric characteristics

| Sample No. | Sintering temperature ° C. | Dielectric constant ∈ | Dielectric loss tan δ (%) | Capacity temperature changing ratio $\Delta C/C_{25}$ (%) max at −55° C. to 25° C. | max at 25° C. to 125° C. |
|---|---|---|---|---|---|
| *1 | 1300 | 5010 | 3.2 | 14.2 | −17.3 |
| 2 | 1300 | 4800 | 3.1 | 10.5 | −12.5 |
| 3 | 1300 | 4620 | 2.9 | 8.1 | −9.1 |
| 4 | 1300 | 4380 | 2.9 | 4.9 | −5.7 |
| 5 | 1300 | 4100 | 2.9 | −2.2 | 6.3 |
| *6 | 1300 | 3900 | 2.8 | −4.3 | 8.5 |
| *7 | 1300 | 5180 | 3.0 | 17.5 | −16.7 |
| 8 | 1300 | 4890 | 2.9 | 12.5 | −13.9 |
| 9 | 1300 | 4200 | 2.9 | 3.1 | −2.2 |
| *10 | 1300 | 3860 | 2.8 | −2.6 | 5.0 |
| *11 | 1300 | 4230 | 4.3 | 12.4 | −2.3 |
| 12 | 1300 | 4250 | 3.3 | 10.9 | −2.1 |
| 13 | 1300 | 4440 | 3.1 | 10.4 | −2.6 |
| 14 | 1300 | 4620 | 2.9 | 8.1 | −9.1 |
| *15 | 1300 | 4750 | 2.9 | −13.5 | −20.2 |
| *16 | 1300 | 5040 | 3.8 | 9.9 | −8.8 |
| 17 | 1300 | 4900 | 3.3 | 10.0 | −19.0 |
| 18 | 1300 | 4750 | 3.1 | 8.9 | −8.2 |
| 19 | 1300 | 4620 | 2.9 | 8.1 | −9.1 |
| 20 | 1300 | 4200 | 2.9 | 7.6 | −8.1 |
| 21 | 1300 | 4030 | 2.8 | 6.0 | −6.8 |
| *22 | 1300 | 3690 | 2.7 | 8.9 | −8.2 |
| *23 | 1300 | 4600 | 2.9 | 7.0 | −11.6 |
| 24 | 1300 | 4640 | 2.8 | 7.5 | −10.5 |
| 25 | 1300 | 4620 | 2.9 | 8.1 | −9.1 |
| 26 | 1300 | 4500 | 2.8 | 8.9 | −10.9 |
| *27 | 1300 | 3200 | 4.9 | −13.0 | −10.0 |
| *28 | 1300 | 4600 | 3.3 | 11.2 | −10.2 |
| 29 | 1300 | 4620 | 2.9 | 8.1 | −9.1 |
| 30 | 1300 | 4600 | 2.7 | 8.2 | −5.5 |
| 31 | 1300 | 4590 | 2.9 | 6.5 | −4.0 |
| *32 | 1300 | 3300 | 4.7 | 4.8 | 5.0 |
| $BaO/TiO_2$ ratio | | | | | |
| *33 | 1300 | 4700 | 2.9 | 17.0 | −13.4 |
| 34 | 1300 | 4650 | 2.9 | 12.1 | −10.4 |
| 35 | 1300 | 4620 | 2.9 | 8.1 | −9.1 |
| *36 | 1300 | 3750 | 4.2 | 4.8 | −4.0 |

Mark * is out of the range of this invention

Table 2 shows the results of electric characteristics such as dielectric constants, dielectric losses, capacity changing ratios of electrostatic capacities relative to temperature, etc. measured with regard to Samples 1 to 36 having the compositions shown in Table 1. Here, "capacity temperature changing ratio ΔC/C25" means how many % electrostatic capacity maximally is changed relative to the electrostatic capacity value at the temperature of 25° C., "max at −55° C. to 25° C." means how many % the electrostatic capacity is maximally changed in the temperature range of −55° C. to 25° C., and "max at 25° C. to 125° C." means how many % the electrostatic capacity is maximally changed in the temperature range of 25° C. to 125° C. In the following, the electric characteristics of the respective samples are considered based on Table 2.

Samples 1 to 6 differ in mol. % of the amounts $Nb_2O_5$ and $Co_3O_4$. That is, they have the same composition except that this molar ratio is different. When the molar ratio is lower than 4.4, for example, in Sample 1, it was found that the capacity changing ratio relative to the temperature exceeds 15%. On the other hand, when the molar ratio exceeds 5, for example, in Sample 6, the capacity changing ratio relative to the temperature is within 15% but the dielectric constant is 3900 which is lower than 4000. Accordingly, it can be found that the molar ratio of $Nb_2O_5$ and $Co_3O_4$ is preferably within the range of 4.4 to 5.0.

Samples 7 to 10 are samples in which the molar ratio of the amount of $Nb_2O_5$ and $Co_3O_4$ is constant and a mol. % of the sum of $Nb_2O_5$ and $Co_3O_4$ is different. Since the molar ratio of the sum of them is different, the mol. % of $BaTiO_3$ is also different as a matter of course, but the amount of the other additives are remained unchanged. When the mol. % is lower than 1.1, for example, in Sample 7, it was found that the capacity changing ratio relative to the temperature exceeds 15%. On the other hand, when the mol. % exceeds 1.4, for example, in Sample 10, the capacity changing ratio relative to the temperature is within 15% but the dielectric constant is as low as 3860. Accordingly, it can be found that the mol. % of the sum of $Nb_2O_5$ and $Co_3O_4$ is preferably within the range of 1.1 to 1.4 mol. %.

Samples 11 to 15 have the same components except that the weight % of $MnCO_3$ in the additives is different. When the amount of $MnCO_3$ is lower than 0.02% by weight, for example, in Sample 11, the dielectric loss becomes large. On the other hand, when the amount of $MnCO_3$ is higher than 0.06% by weight, for example, in Sample 15, it was found that the capacity changing ratio relative to the temperature exceeds 15%. Accordingly, the weight % of the amount of $MnCO_3$ as an additive is preferably within the range of 0.02% by weight to 0.06% by weight.

Samples 16 to 22 comprise the same components except that the weight % of the amount of $Nd_2O_3$ in the additives is different. When the amount of $Nd_2O_3$ is lower than 0.02% by weight, for example, in Sample 16, the dielectric loss becomes large as 3.8. On the other hand, when the amount of $Nd_2O_3$ is higher than 0.25% by weight, for example, in Sample 22, it was found that the dielectric constant becomes 3690. Accordingly, the weight % of $Nd_2O_3$ as an additive is preferably within the range of 0.02% by weight to 0.25% by weight.

Samples 23 to 27 have the same components except that the weight % of the amount of $Y_2O_3$ in the additives is different. When the amount of $Y_2O_3$ is lower than 0.02% by weight, for example, in Sample 23, it shows good electric characteristics that the dielectric constant exceeds 4000, the electric loss is small and the capacity changing ratio relative to the temperature is within 15%. However, when the amount of $Y_2O_3$ is lower than 0.02% by weight, the change in the electrostatic capacity as a function of time becomes large.

FIG. 1 is a graph showing the change in electrostatic capacity of a laminated ceramic capacitor which comprises a compound comprising 98.8 mol. % of $BaTiO_3$, 0.986 mol. % of $Nb_2O_5$ and 0.214 mol. % of $Co_3O_4$ to which 0.06% by weight of $MnCO_3$, 0.1% by weight of $Nd_2O_3$, 0.05% by weight of $Al_2O_3$ and $Y_2O_3$ a weight % of which is changed are added as additives. In FIG. 1, the electrostatic capacity of the laminated ceramic capacitor was measured immediately after preparation thereof and after 1000 hours from initiation of said preparation, and FIG. 1 shows the change in the electrostatic capacity from the preparation to after 1000 hours. As clearly seen from FIG. 1, when $Y_2O_3$ is lower than 0.02% by weight, it can be found that the change in the electrostatic capacity with a lapse of time becomes large. On the other hand, when $Y_2O_3$ is higher than 0.10% by weight, for example, in Sample 27, the dielectric constant becomes lower than 4000 and the dielectric loss becomes large. Accordingly, the weight % of $Y_2O_3$ as an additive is preferably within the range of 0.02% by weight to 0.10% by weight.

Samples 28 to 32 have the same components except that the weight % of $Al_2O_3$ in the additives is different. When $Al_2O_3$ is lower than 0.02% by weight, for example, in Sample 28, it shows good electric characteristics that the dielectric constant exceeds 4000, the electric loss is small and the capacity changing ratio relative to the temperature is within 15%. However, when the sintering temperature is changed, it was found that the changing ratio relative to the temperature of the electrostatic capacity exceeds 15%. FIG. 2(A) to FIG. 2(E) are graphs showing the capacity changing ratio relative to the temperature of the compound comprising 98.8 mol. % of $BaTiO_3$, 0.986 mol. % of $Nb_2O_5$ and 0.214 mol. % of $Co_3O_4$ to which 0.06% by weight of $MnCO_3$, 0.1% by weight of $Nd_2O_3$, 0.05% by weight of $Y_2O_3$, and the weight % of $Al_2O_3$ being changed to 0% by weight, 0.05% by weight, 0.10% by weight, 0.15% by weight and 0.20% by weight are added as additives, and sintered at the sintering temperature of 1270° C., 1300° C. or 1330° C. As can be seen from FIG. 2(A), when $Al_2O_3$ is 0% by weight, the capacity changing ratio exceeds 15% at the sintering temperature of 1330° C. On the other hand, as shown in FIG. 2(B) to FIG. 2(E), it was found when $Al_2O_3$ is 0.05% by weight or more, the capacity changing ratio was within 15% even if changing the sintering temperature. Thus, the fact that the capacity changing ratio relative to the temperature becomes within 15% even if changing the sintering temperature means that there is little sintering temperature dependency. This provides a great profit that stable products can be obtained when producing a laminated ceramic capacitor. Also, when $Al_2O_3$ is lower than 0.15% by weight, as clearly seen from Table 2, the electric loss becomes lower than 4000 and the dielectric loss becomes large. Accordingly, the weight % of $Al_2O_3$ as an additive is preferably within the range of 0.05% by weight to 0.15% by weight.

Figure 3:
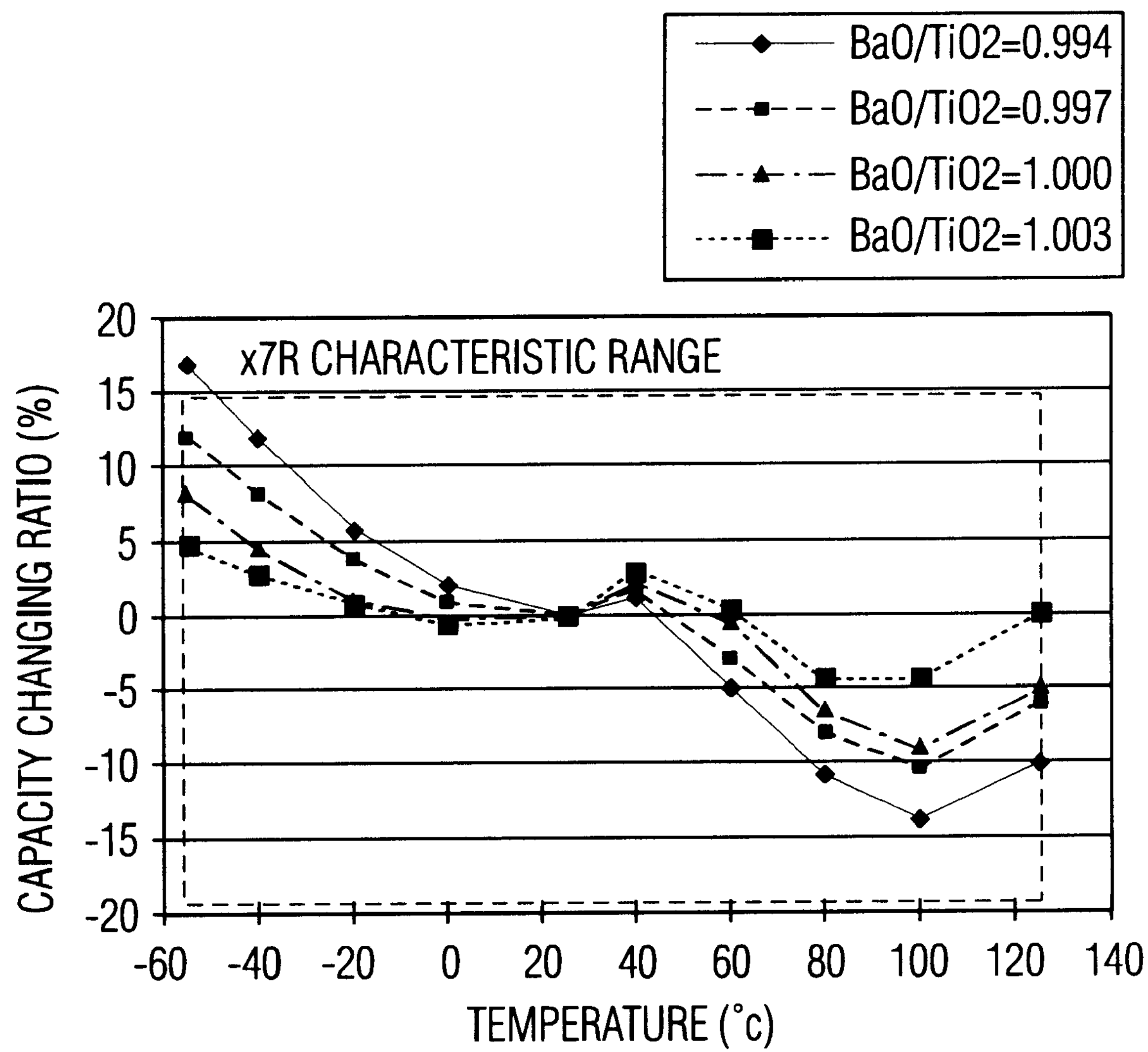
FIG. 3 is a graph showing a capacity changing ratio of a $BaO/TiO_2$ ratio and an electrostatic capacity relative to temperature.

Samples 33 to 36 are, as shown in Table 1, laminated ceramic capacitors of the compound comprising 98.8 mol. % of $BaTiO_3$, 0.986 mol. % of $Nb_2O_5$ and 0.214 mol. % of $Co_3O_4$ to which 0.06% by weight of $MnCO_3$, 0.1% by weight of $Nd_2O_3$, 0.05% by weight of $Y_2O_3$ and 0.05% by weight of $Al_2O_3$ were added as additives, and capacitors in which the ratio of BaO and $TiO_2$ is changed. When the $BaO/TiO_2$ ratio is lower than 0.997, for example, in Sample 33, it was found that the capacity changing ratio relative to the temperature exceeds 15%. FIG. 3 shows the capacity changing ratio relative to the temperature when the $BaO/TiO_2$ ratio of 0.994, 0.997, 1.000 and 1.003, respectively. As can be seen from FIG. 3, at the $BaO/TiO_2$ ratio of 0.994, the capacity changing ratio exceeds 15%. On the other hand, when the $BaO/TiO_2$ ratio is larger than 1.0, for example, in Sample 36, the dielectric loss becomes large as shown in Table 2. Accordingly, the $BaO/TiO_2$ ratio is preferably within the range of 0.997 to 1.000.

As explained above, the laminated ceramic capacitor of the present invention is plateau in the capacity changing ratio of the electrostatic capacity within ±15% in a wide temperature range of −55° C. to +150° C., and small in a dielectric loss of within 3.5%. Moreover, a dielectric constant is high as 4000 or more whereby a laminated ceramic capacitor with a small sized and a high capacity, and having good temperature characteristics can be obtained. Furthermore, sintering-temperature dependency of an electrostatic capacity changing ratio is small so that a laminated ceramic capacitor stable in industrial production can be obtained.

What is claimed is:

1. A dielectric ceramic composition comprising a compound of $BaTiO_3$—$Nb_2O_5$—$Co_3O_4$ group containing 1.1–1.4 mol. % of in total $Nb_2O_5$ and $Co_3O_4$ wherein the molar ratio of $Nb_2O_5$ to $Co_3O_4$ is between 4.4 and 5.0, said dielectric ceramic composition comprising as an additive 0.02–0.06% by weight of $MnCO_3$, 0.02 to 0.25% by weight of $Nd_2O_3$, 0.02 to 0.10% by weight of $Y_2O_3$ and 0.05 to 0.15% by weight of $Al_2O_3$ with respect to the weight of said compound.

2. The dielectric ceramic composition as claimed in claim 1 characterized in that a molar ratio of BaO to $TiO_2$ is between 0.997 and 1.000.

* * * * *